Nov. 11, 1952      S. SLAUGHTER      2,617,682
WHEELBARROW WITH RESILIENTLY SUPPORTED DUMP BODY
Filed Nov. 18, 1946      3 Sheets-Sheet 1

SAMUEL SLAUGHTER,
INVENTOR.

BY Donald E. Windle.
ATTORNEY.

Nov. 11, 1952  S. SLAUGHTER  2,617,682
WHEELBARROW WITH RESILIENTLY SUPPORTED DUMP BODY
Filed Nov. 18, 1946  3 Sheets-Sheet 2

SAMUEL SLAUGHTER,
INVENTOR.

BY Donald E. Windle.
ATTORNEY.

Nov. 11, 1952 S. SLAUGHTER 2,617,682
WHEELBARROW WITH RESILIENTLY SUPPORTED DUMP BODY
Filed Nov. 18, 1946 3 Sheets-Sheet 3
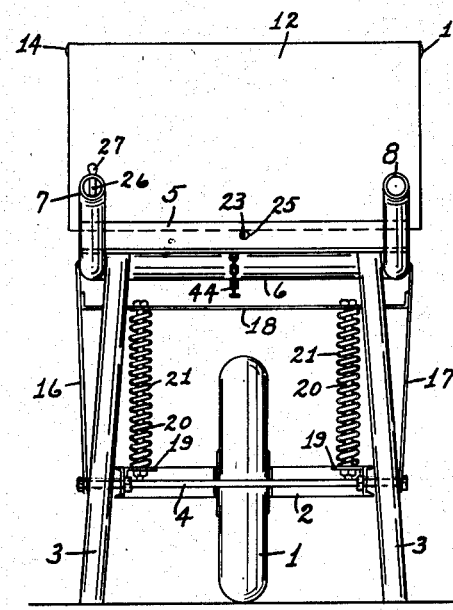
Samuel Slaughter,
INVENTOR.
BY Donald E. Windle
ATTORNEY.

Patented Nov. 11, 1952

2,617,682

UNITED STATES PATENT OFFICE 2,617,682

WHEELBARROW WITH RESILIENTLY SUPPORTED DUMP BODY

Samuel Slaughter, Richmond, Ind., assignor of one-half to Donald E. Windle, Richmond, Ind.

Application November 18, 1946, Serial No. 710,491

2 Claims. (Cl. 298—3)

The present invention relates to wheelbarrows, and more especially to the types of wheelbarrows which provide means therein for unloading or dumping the load thereof without the necessity of upsetting the wheelbarrow.

The principal object of the invention is the provision of a wheelbarrow which is capable of being unloaded from the forward end thereof, and with the forward end member being swingably secured therein, and being adapted to swing forwardly when the load is being dumped from the wheelbarrow.

A second object of the invention is the provision of a wheelbarrow having the body thereof in pivoted relation to the framework and with the movement thereof providing means for permitting the load carried thereby to be unloaded at the forward end thereof.

A third object of the invention is the provision of means resiliently supporting the bed with relation to the ground wheel and with said means tending to absorb shocks which might otherwise be transmitted to the user.

A further object is the provision of latching means in connection with the hinged forward end member, and with the latch operating means being located within one of the handle members of the wheelbarrow.

A still further object is the provision of means normally retaining the body member in its carrying position and with said means permitting the release of the body member from its normally fixed position to a dumping position.

Further objects and particular advantages of the invention will suggest themselves in the course of the following description, and that which is new will be pointed out in the appended claims.

The preferred, and most satisfactory means for carrying out the principles of the invention in a practical manner is shown in the accompanying three sheets of drawings, in which:

Figure 7 is a detail rear elevation of the wheelbarrow, taken from line 7—7 of Figure 1.

Figure 8 is a top plan view of the ground wheel and the lower frame member, with the view being taken from line 8—8 of Figure 1.

Figure 9 is a detail section, taken on line 9—9 of Figure 3, and showing the slotted aperture through which the latch operating rod extends.

Figure 10 is a detail section taken on line 10—10 of Figure 3.

Figure 3:
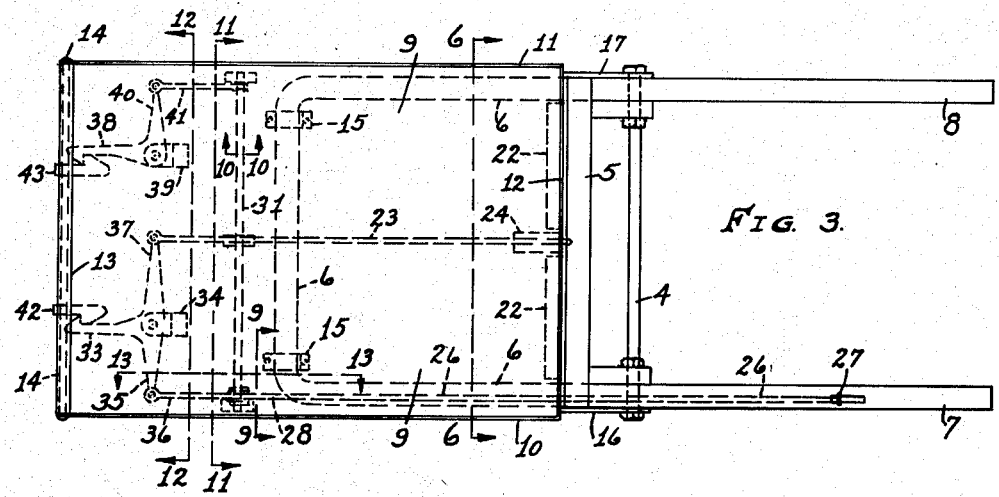
Figure 3 is a top plan view of the wheelbarrow, taken from line 3—3 of Figure 1, and showing the latching members in engaged relation, and in broken lines.

Figures 11, 12, and 13 are detail sections taken on lines 11—11, 12—12, and 13—13 respectively, of Figure 3.

Figure 14 is a detail section through the hinged joint formed at the upper end of the front body member, as taken on line 14—14 of Figure 12.

Similar characters of reference designate like parts throughout the several views.

Referring now to the drawings in detail, numeral 1 designates the ground wheel which is journalled in the forward portion of the lower frame member 2 in the conventional manner. The rearwardly extending ends of the frame 2 are pivotally secured through respective leg members 3 by means of rod 4 extending therethrough.

The upper ends of leg members 3 are rigidly secured to cross angle 5 by welding, or by other suitable means, and with the end portions of the cross angle 5 being secured to the upper frame 6 in a suitable manner. The upper frame 6 is preferably formed of tubular material which is formed in a U-shape, with the rearward extensions thereof forming handle members 7 and 8.

A body is provided, with the same being composed of a bottom member 9, side members 10 and 11, and a rear end member 12, all of which are rigidly secured together, preferably by means of welding. The forward end member of the body is composed of a plate 13 which is hingedly secured between the forward end portions of side members 10 and 11 by means of hinge rod 14, which extends between the side members and forms a tie therebetween.

The body is pivotally secured to frame 6 by means of trunnion members 15 which are located near each side of the bottom member 9, and are rigidly secured thereto.

Brace members 16 and 17 are located on the sides of the wheelbarrow and have the upper ends thereof rigidly secured to the respective sides of frame member 6, and with the lower ends thereof being secured to the respective leg members by means of the bolt 4. The lower ends of the braces may be further and more rigidly secured to the respective leg members by means of welding. A cross bar member 18 extends between the upper end portions of braces 16 and 17, and is rigidly secured thereto.

Angle clip members 19 are rigidly secured to the inner surface of lower frame 2, and are located in substantial vertical alignment with the cross bar member 18. A suspension rod 20 is provided at each side with the upper ends of the rods extending through the cross bar member 18, and with the lower ends thereof being extended downwardly through the respective angle clip members 19. A compression spring 21 is located on each of the suspension rods with the springs providing means for resiliently supporting the forward end portion of the upper frame with relation to the lower frame 2. The rods 20 have nuts threaded on the lower ends thereof with the same providing means for adjusting the compression of the springs 21. It will be noted that the rods 20 and springs 21 permit the lower frame 2 and the ground wheel 1 to move upwardly with relation to the upper frame member should the wheel strike a raised surface, or in the travel over a rough surface, and thereby eliminating or reducing the shock which would be carried through the handle members, as in the conventional wheelbarrow mountings.

Figure 1:
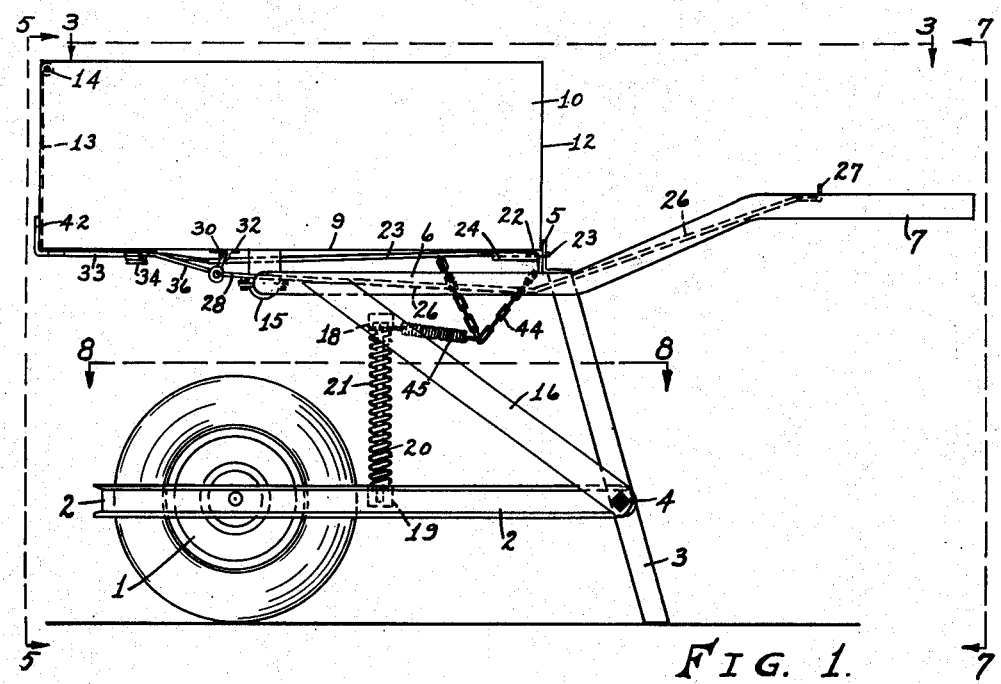
Figure 1 is a left side elevation of the wheelbarrow embodying the principles of the invention, and with the body member thereof being shown in its normal position.
Figure 6:
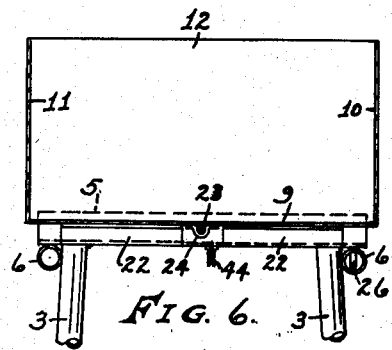
Figure 6 is a cross sectional detail through the body member, taken on line 6—6 of Figure 3.

Angle members 22 are rigidly secured to the forward face of the cross angle member 5, and provide means for supporting the rear end of the body member when the body is in its normal position, as indicated in Figures 1 and 6.

The body member is held in normal position by means of rod 23 which extends longitudinally under the body, with the rear end of rod 23 being housed in housing member 24 which is secured to the under side of bottom member 9. An aperture 25 is provided in the cross angle member 5 and is located in registering relation with the end of rod 23. When the body is in its normal position, the end of rod 23 engages cross angle member 5 through aperture 25, and prevents upward movement of the rear end portion of the body with relation to the cross angle member 5.

The latching mechanism is controlled by means of operating rod 26 which is enclosed within and extends longitudinally of handle 7 and frame 6. An upwardly-directed end 27 is formed on the rear end portion of rod 26, with the same extending upwardly through an elongated aperture formed in handle member 7. The forward end 28 of operating rod 26 extends forwardly of upper frame member 6 through slot 29, and has its forward end connected with an arm 30 of cross rod 31, which is pivotally supported under the bottom member by means of brackets 32.

Figure 4:
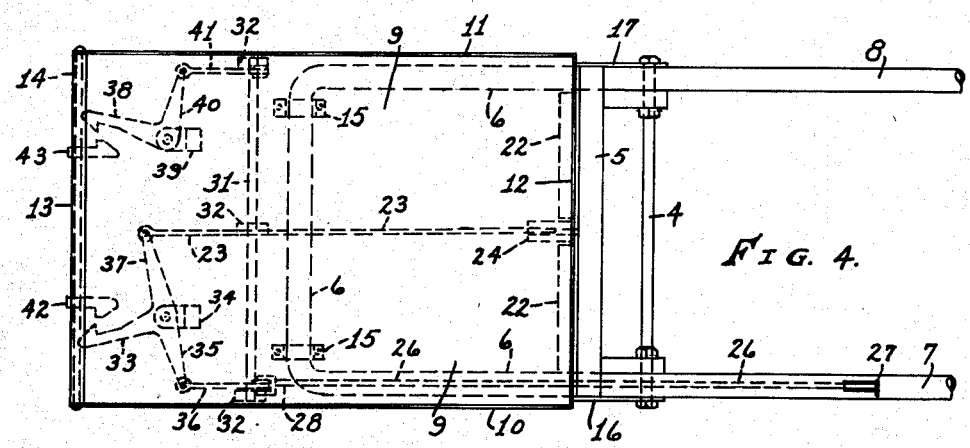
Figure 4 is also a top plan view of the wheelbarrow similar to that shown in Figure 3 but with the latching members being shown in unlatched or disengaged relation.
Figure 5:
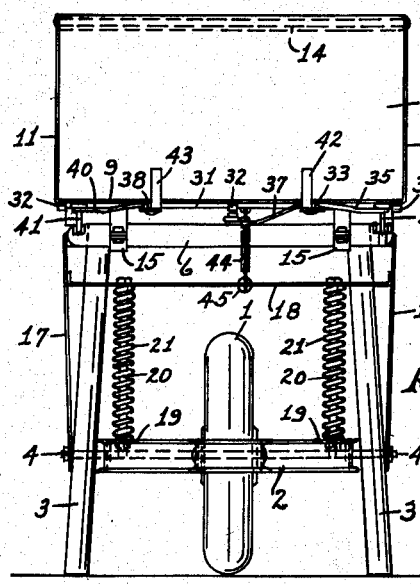
Figure 5 is a front elevational view of the wheelbarrow, taken from line 5—5 of Figure 1.

Latch member 33 is pivotally secured to the under side of bottom 9 by means of bracket 34. The latch member is provided with an arm 35 which is connected to the same arm 30 of cross rod 31 to which the forward end 28 of rod 26 is connected, with arm 35 being connected to arm 30 by means of connecting rod 36. A second arm 37 is formed on latch member 33 and extends inwardly from the pivotal connection with bracket 34. The forward end of rod 23 is pivotally connected to the inwardly extending end of arm 37, as shown more clearly by broken lines in Figures 3 and 4. Latch member 38 is oppositely disposed with relation to latch 33, and is pivotally secured to the under side of bottom 9 by means of bracket 39, and has an outwardly extending arm 40 formed thereon. Connecting rod 41 has its forward end connected to the arm 40, and with the rearward end thereof being connected with the respective arm 30 of cross rod 31. It will be noted, by reference to Figures 3, 4, and 13, that rearward movement of rod 26 operates latch 33 from the position shown in Figure 3 to the position shown in Figure 4 through the connection thereof with respective arm 30 of cross rod 31, and through connecting rod 36. With the sideward movement of arm 33, arm 37 is moved forwardly and withdraws the rear end of rod 23 from its connection with cross angle 5. Rotational movement of cross rod 31 provides means, through an arm 30 and connecting arm 41, moving latch member 38 from the position shown in Figure 3 to the position shown in Figure 4.

Latch keepers 42 and 43 are secured to the lower portion of swingable forward end member 13, with the lower ends of keepers 42 and 43 being turned rearwardly under the body member 9 and are adapted to swing into engaging relation with latches 33 and 38 respectively.

Figure 2:
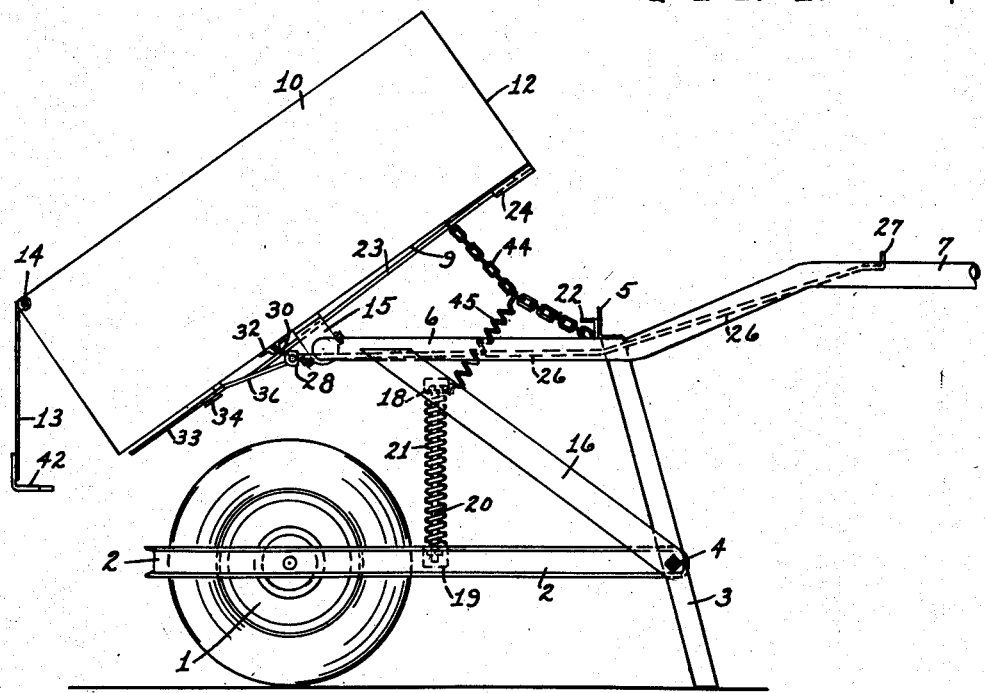
Figure 2 is an elevational view similar to that shown in Figure 1 but with the body of the wheelbarrow being shown in dumping relation.

It will be further observed, by reference to the several figures, that rearward movement of latch operating rod 26 provides means disengaging latches 33 and 38 from their respective keepers 42 and 43, and simultaneously therewith, rod 23 is drawn forwardly and out of engagement with cross angle 5, and permitting the body member to be tilted from its normal position shown in Figure 1 to dumping or unloading position as shown in Figure 2. The forward tilting movement of the body is accomplished by a slight upward movement of the handles by the operator.

In order to prevent undue tilting or pivotal movement of the body in its dumping or unloading motion, I have provided a flexible member, such as a linked chain 44 with the same being secured at one of its ends to the under side of bottom member 9, and secured at the opposite end thereof to cross angle 5. In order to provide positive and accelerated return movement of the body from the dumping position shown in Figure 2 to the normal position shown in Figure 1, I provide a tension spring 45 having one end thereof secured into chain 44 and with the opposite end of the spring being secured to cross bar 18. The tension of the spring 45 provides means only for starting the return of the body member to its normal position from the dumping position.

The relative location of the trunnion members 15 with respect to the forward and rear ends of the body permits the body to return to its normal position after being started from its dumping position by the action of spring 45.

*Operation*

In using the wheelbarrow, the same is propelled in the usual and conventional manner. When it is desired to dump the load from the wheelbarrow, the operator moves rod 26 rearwardly by means of a rearward pull on the upwardly extending end portion 27. Rearward movement of rod 26 disengages latches 33 and 38 from their respective keepers 42 and 43 and, simultaneously therewith, rod 23 is moved forwardly out of engagement with cross angle 5. The wheelbarrow is then given a tilting action by a slight upward movement of handles 7 and 8 by the operator, and upon which motion, the body is tilted or pivoted to the position shown in Figure 2, and with the latches being disengaged from the latch keepers and permitting free hinging movement of front end member 13. As soon as the load of material has dumped from the body, spring 45 provides means starting the body to its normal position. As soon as the body member has returned to its normal position, rod 26 is moved forwardly to its original position by means of forward movement of upwardly extending end 27 by the operator, the motion of which engages the latches with the latch keepers, and moves rod 23 rearwardly into engagement with aperture 25 of cross angle 5.

Although the preferred manner of accomplishing the desired results of the invention is shown in the accompanying drawings and described in the foregoing specification, I desire that it be understood that I am not to be limited to the exact design and arrangement of the associated parts, but that minor changes may be made therein, insofar as the changes may fall within the scope of the appended claims.

Having now shown and described the invention, what I claim is:

1. In a wheelbarrow, a lower frame, a ground wheel secured in said lower frame, an upper frame, a body member pivotally secured to said upper frame, with said lower frame being secured in pivotal relation with said upper frame, and means permitting resilient action of the lower frame with relation to said upper frame and relieving the handles of the wheelbarrow from wheel shock.

2. In a wheelbarrow, a lower frame member, a ground wheel positioned in said lower frame member, an upper frame member, a pair of leg members extending between the frame members, pivotal means securing projecting rear end portions of the lower frame member to the leg members, with the lower frame member being in pivotal relation with the upper frame member, and means permitting resilient pivotal movement of the lower frame member with relation to the upper frame member.

SAMUEL SLAUGHTER.

REFERENCES CITED

The following references are of record in the file of this patent:

UNITED STATES PATENTS

| Number | Name | Date |
|---|---|---|
| 42,746 | Carpenter | May 17, 1864 |
| 216,999 | Clark | July 1, 1879 |
| 447,442 | Behrman | Mar. 3, 1891 |
| 1,261,532 | Hoe | Apr. 2, 1918 |
| 1,618,871 | Fleetwood | Feb. 22, 1927 |
| 1,858,797 | Wood et al. | May 17, 1932 |
| 2,330,944 | Balls | Oct. 5, 1943 |
| 2,426,081 | Cheek | Aug. 19, 1947 |

FOREIGN PATENTS

| Number | Country | Date |
|---|---|---|
| 29,008 | Australia | Sept. 15, 1930 |
| 702,242 | France | Jan. 20, 1931 |
| 1,963 | Great Britain | Aug. 7, 1861 |